United States Patent
Mantell et al.

(10) Patent No.: US 9,914,264 B2
(45) Date of Patent: Mar. 13, 2018

(54) SYSTEM AND METHOD FOR MISSING EJECTOR CORRECTION IN THREE-DIMENSIONAL OBJECT PRINTING BY WAVEFORM ADJUSTMENT

(71) Applicant: Xerox Corporation, Norwalk, CT (US)

(72) Inventors: David A. Mantell, Rochester, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 485 days.

(21) Appl. No.: 14/572,063

(22) Filed: Dec. 16, 2014

(65) Prior Publication Data

US 2016/0167298 A1 Jun. 16, 2016

(51) Int. Cl.
| | | |
|---|---|---|
| *B41J 29/393* | (2006.01) |
| *B29C 67/00* | (2017.01) |
| *B33Y 10/00* | (2015.01) |
| *B33Y 30/00* | (2015.01) |
| *B33Y 50/02* | (2015.01) |

(52) U.S. Cl.
CPC ...... *B29C 67/0059* (2013.01); *B29C 67/0088* (2013.01); *B33Y 10/00* (2014.12); *B33Y 30/00* (2014.12); *B33Y 50/02* (2014.12)

(58) Field of Classification Search
CPC .................................................... B41J 29/393
See application file for complete search history.

(56) References Cited

U.S. PATENT DOCUMENTS

| | | | | |
|---|---|---|---|---|
| 7,146,236 | B2 * | 12/2006 | Silverbrook | B22F 3/008 425/130 |
| 7,693,595 | B2 | 4/2010 | Silverbrook | |
| 7,766,442 | B2 * | 8/2010 | Yamanobe | B41J 2/04508 347/14 |
| 8,240,800 | B2 * | 8/2012 | Seto | B41J 2/04516 347/10 |
| 2008/0118655 | A1 | 5/2008 | Kritchman | |

FOREIGN PATENT DOCUMENTS

WO 2004/024447 A2 3/2004

* cited by examiner

*Primary Examiner* — Lamson Nguyen
(74) *Attorney, Agent, or Firm* — Maginot Moore & Beck LLP

(57) ABSTRACT

A method for compensating for inoperative ejectors in a three-dimensional object printer has been developed. A printer detects an inoperative ejector in a printhead. The printer identifies functional ejectors that print at locations adjacent to locations where the inoperative ejector fails to print a drop. The printer modifies firing signals for the functional ejectors so those ejectors print drops having an increased drop volume at the locations adjacent to locations where the inoperative ejector fails to print a drop. The printer prints a first layer of material drops using the modified firing signals. The printer advances the printhead in the cross-process direction between layers so that locations where the inoperative ejector fails do print a drop do not coincide between layers.

14 Claims, 5 Drawing Sheets

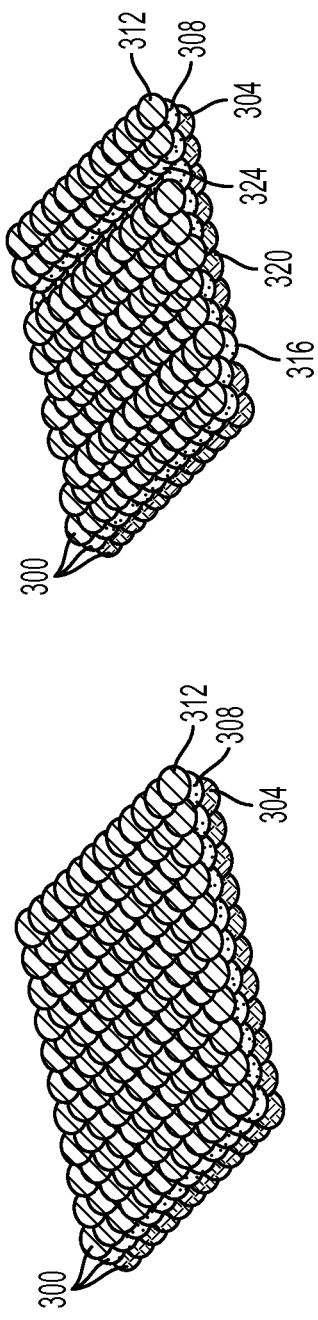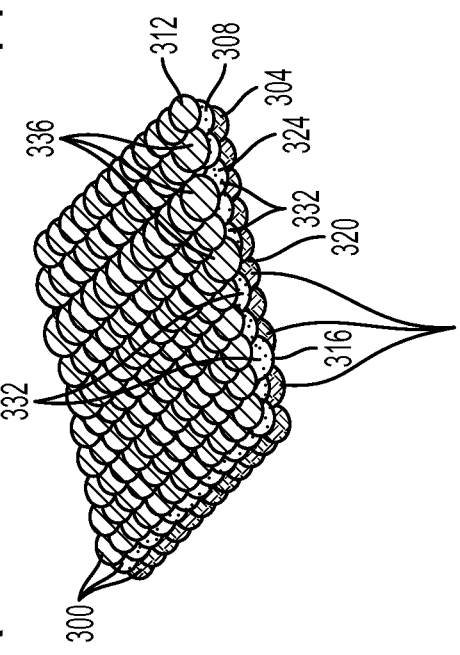

SYSTEM AND METHOD FOR MISSING EJECTOR CORRECTION IN THREE-DIMENSIONAL OBJECT PRINTING BY WAVEFORM ADJUSTMENT

TECHNICAL FIELD

The system and method disclosed in this document relate to printers that produce three-dimensional objects and, more particularly, to compensating for inoperative ejectors in such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the ejectors in the printheads that eject the drops of material that form the objects. During printing of an object, one or more ejectors can deteriorate by ejecting the material at an angle, rather than normal, to the ejector, ejecting drops that are smaller than an ejector should eject, or by failing to eject any drop at all. An ejector suffering from any of these operational deficiencies is known as an inoperative or malfunctioning ejector. If the operational status of one or more ejectors deteriorates during object printing, the quality of the printed object cannot be assessed until the printing operation is completed. Consequently, print jobs requiring many hours or multiple days can produce objects that do not conform to specifications due to inoperative ejectors in the printheads. Once such objects are detected, the printed objects are scrapped, restorative procedures are applied to the printheads to restore ejector functionality, and the print job is repeated.

Systems that enable detection of inoperative ejectors while printing have been developed. A system that applies restorative procedures to compensate for inoperative ejectors during object printing would enable the continued production of a properly formed object. In this manner, product yield for the printer would be improved and its printing would be more efficient.

SUMMARY

A method that compensates for a malfunctioning ejector in a three-dimensional object printer includes the steps of detecting a malfunctioning ejector in the printhead; identifying at least one functional ejector in the printhead that ejects drops of material adjacent to positions opposite the malfunctioning ejector; modifying firing signals delivered to the at least one identified functional ejector to increase a drop volume of the material drops ejected adjacent to the positions opposite the malfunctioning ejector; and operating the printhead to form a first layer of material drops, the at least one identified functional ejector being operated with the modified firing signals.

A three-dimensional printer that implements the method for compensating for a malfunctioning ejector includes a printhead having a plurality of ejectors configured to eject material drops; a sensor configured to generate data corresponding to the material drops ejected by the ejectors in the printhead; and a controller operatively connected to the printhead and the sensor, the controller being configured to: identify a malfunctioning ejector with reference to the data generated by the sensor; identify at least one functional ejector in the printhead that ejects drops of material adjacent to positions opposite the malfunctioning ejector; modify firing signals delivered to the at least one identified functional ejector to increase a drop volume of the material drops ejected adjacent to the positions opposite the malfunctioning ejector; and operate the printhead to form a first layer of material drops, the at least one identified functional ejector being operated with the modified firing signals.

BRIEF DESCRIPTION OF THE DRAWINGS

The foregoing aspects and other features of a system and method for compensating for a malfunctioning ejector in a three-dimensional object printer are explained in the following description, taken in connection with the accompanying drawings.

FIG. 3A is a perspective view of three layers of a small region of a three-dimensional object when all ejectors of a printhead are in working condition.

FIG. 3B is a perspective view of three layers of a small region of a three-dimensional object when a printhead has an inoperative ejector.

FIG. 3C is a perspective view of three layers of a small region of a three-dimensional object when a printhead compensates for an inoperative ejector.

DETAILED DESCRIPTION

Figure 1:
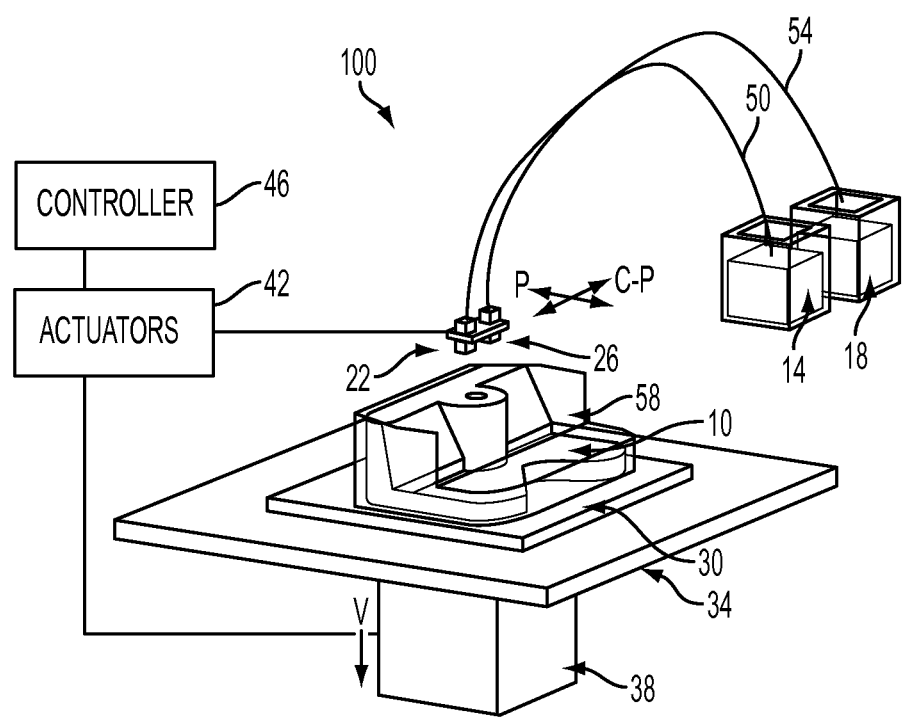
FIG. 1 is a perspective view of a three-dimensional object printer.

For a general understanding of the environment for the system and method disclosed herein as well as the details for the system and method, reference is made to the drawings. In the drawings, like reference numerals designate like elements.

FIG. 1 shows a configuration of components in a printing system 100, which produces a three-dimensional object or part 10. As used in this document, the term "three-dimensional printer" refers to any device that ejects material with reference to image data of an object to form a three-dimensional object. The printing system 100 includes a support material reservoir 14, a building material reservoir 18, a pair of ejector printheads 22, 26, a build substrate 30, a planar support member 34, a columnar support member 38, an actuator 42, and a controller 46. Conduit 50 connects printhead 22 to support material reservoir 14 and conduit 54 connects printhead 26 to building material reservoir 18. Both ejector printheads are operated by the controller 46 with reference to three-dimensional image data in a memory operatively connected to the controller to eject the support and building materials supplied to each respective printhead. Each datum stored in a single location in the three-dimensional image data is defined as a "voxel" in this document. The building material forms the structure of the part 10 being produced, while the support structure 58 formed by the support material enables the building material to maintain its shape while the material solidifies as the part is being constructed. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
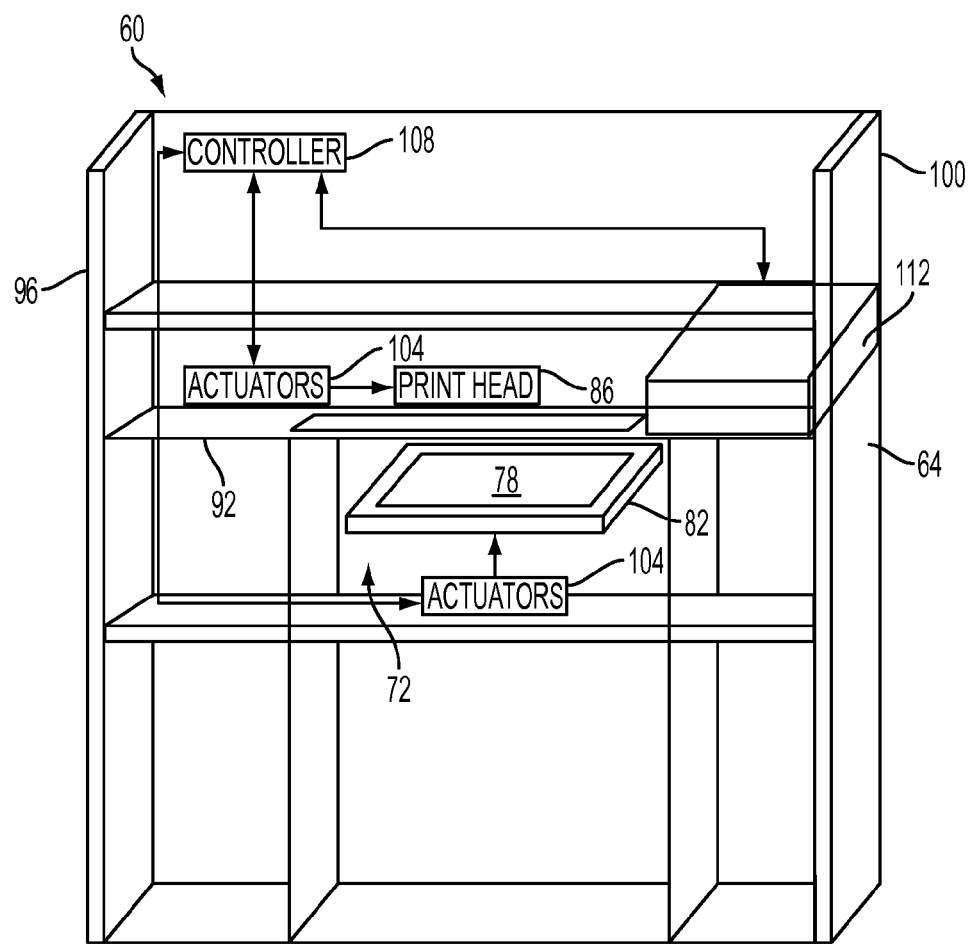
FIG. 2 is a front view of a three-dimensional object printer having a housing that depicts a detection module within the housing that enables inoperative ejectors in a printhead to be detected during a printing operation.

A three-dimensional object printer having a housing is shown in FIG. 2. A printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the ejectors in the printhead 86, vertically moving the support platform 82, and horizontally moving the printhead 86 on the member 92, a three-dimensional object can be formed on the planar support 78.

The housing 64 further includes a detection module 112 that is configured to detect inoperative ejectors in the printer 60. As noted above, if an ejector fails during printing of an object by either completely or partially failing to eject material or by errantly ejecting material in a skewed direction, the object being produced is malformed. The detection module 112 is configured to detect inoperative ejectors during object production. In some embodiments, at predetermined times in the printing operation, the controller 108 operates an actuator 104 to move the printhead 86 into the detection module 112. The detection module 112 generates a signal to the controller 108 to operate the ejectors in the printhead 86 to print a test pattern on a surface of a substrate or other suitable surface. After the test pattern is printed, controller 108 can move the printhead 86 out of the detection module. The detection module 112 collects data from the printed test pattern. The data may include image data, thickness data, electrical conductivity data, or any other relevant data. The data may be collected using a sensor, such as an optical sensor, an ultrasonic sensor, or a conductivity sensor. The detection module 112 analyzes the data to identify inoperative ejectors. If inoperative ejectors are identified, the detection module 112 generates a signal indicative of the defective printhead and sends it to the controller 108. A signal indicative of the defective printhead may also be sent or displayed to the operator of the printer.

When an inoperative ejector is identified, the controller 108 begins restorative procedures to compensate for the inoperative ejector. By way of example, FIG. 3A, FIG. 3B, and FIG. 3C show how compensation for an inoperative ejector is performed to enable the continued production of a properly formed object. FIG. 3A shows three layers of a small region of a three-dimensional object when all ejectors are in working condition. A printhead prints a first layer 304. The first layer 304 comprises a plurality of drops 300 of material printed in a common plane. The drops 300 are printed with a uniform drop volume. Next, the printhead prints a second layer 308 atop the first layer 304, and then a third layer 312 atop the second layer 308. The second layer 308 and the third layer 312 each similarly comprise a plurality of drops 300 printed with a uniform drop volume in a common plane. For illustrative purposes, the figures depict the drops 300 as they are deposited, without reference to spreading or combining that might occur.

FIG. 3B depicts the same layers 304, 308, and 312 when printed with a printhead having an inoperative ejector. The printhead prints the first layer 304 with a missing pass 316. The missing pass 316 corresponds to the positions opposite the inoperative ejector where drops fail to print while printing the first layer 304. Next, the printhead prints the second layer 308 with a missing pass 320. The missing pass 320 corresponds to the positions opposite the inoperative ejector where drops fail to print while printing the second layer 308. Furthermore, the printhead is advanced in the cross-process direction by three positions so that the missing pass 320 in the second layer 308 does not coincide with the missing pass 316 in the first layer 304. Although an advance of the printhead by three positions is shown for illustrative purposes, in practice using larger advances between each layer would be advantageous. Finally, the printhead prints the third layer 312 with a missing pass 324. The missing pass 324 corresponds to the positions opposite the inoperative ejector where drops fail to print while printing the third layer 312. The printhead is similarly advanced in the cross-process direction by three positions so that the missing pass 324 in the third layer 312 does not coincide with the missing pass 320 in the second layer 308. As shown in FIG. 3B, the missing passes 316, 320, and 324 form hollow portions in the layers 304, 308, and 312, respectively. These hollow portions cause undesirable irregularities in the layers after the drops have been spread and combined. These irregularities can cause an object being printed to become malformed or dysfunctional.

FIG. 3C demonstrates how compensation for the missing passes 316, 320, and 324 can be achieved by increasing the volume of the drops ejected by ejectors forming passes adjacent to the missing passes. The printhead prints the first layer 304 with the missing pass 316. To compensate for the inoperative ejector, the printhead prints certain compensating drops 328 in the first layer 304 with an increased drop volume. The printhead prints compensating drops 328 at positions adjacent to the missing pass 316. In this way, the printer compensates for the hollow portion formed by the missing pass 316 in the first layer 304. Additionally, the printhead prints compensating drops 328 at positions that coincide with the missing pass 320 in the second layer 308. In this way, the printer compensates for the hollow portion that is formed by the missing pass 320. Next, the printhead prints the second layer 308 with the missing pass 320. The printhead prints certain compensating drops 332 in the second layer 308 with an increased drop volume. These compensating drops are shown as having an exaggerated size in the figure. The printhead prints compensating drops 332 at positions adjacent to the missing pass 320 to further compensate for the hollow portion formed by the missing pass 320. Additionally, the printhead prints compensating drops 332 at positions that coincide with the missing pass 316 in the first layer 304 to further compensate for the hollow portion formed by the missing pass 316. The printhead also prints compensating drops 332 at positions that coincide with the missing pass 324 in the third layer 312 to compensate for the hollow portion that is formed by the missing pass 324. Finally, the printhead prints the third layer 312 with the missing pass 324. The printhead prints certain compensating drops 336 in the third layer 312 with an increased drop volume. Again, these drops are depicted with an exaggerated size for illustrative purposes. The printhead prints compensating drops 336 at positions adjacent to the missing pass 324 to further compensate for the hollow portion formed by the missing pass 324. Additionally, the printhead prints compensating drops 336 at positions that coincide with the missing pass 320 in the second layer 308 to further compensate for the hollow portion formed by the missing pass 320.

As illustrated and discuss with respect to FIG. 3C, the printhead prints compensating drops at positions that are immediately adjacent to positions corresponding to missing passes in the same, previous, or subsequent layers. The increased volume of the compensating drops helps to fill the hollow portion formed by a missing pass. This generally occurs because processes such as the natural flow or spreading of the drop material or the motion of the drops enable the drops to settle to their resting place after printing. However, the printhead may print additional compensating drops at positions that are two or more positions or layers away from the missing passes. If the printhead prints a greater number of compensating drops that neighbor a missing pass, then the required drop volume increase for each of the compensating drops is lessened. The increase in drop volume required to compensate for a missing pass can be distributed amongst all of the neighboring compensating drops based on the characteristics of the drop material and based upon each compensating drop's distance from the missing pass.

As used herein, "adjacent" means that the print location selected for a compensating drop is sufficiently close to the print location corresponding to the inoperative ejector that placing a drop having increased volume at that print location contributes to compensating for the failure of the inoperative ejector to print a drop in the intended location satisfactorily. For example, in some printer systems, compensating drops can be ejected within three print locations from the print location of the inoperative ejector in order to achieve satisfactory compensation.

Figure 4:
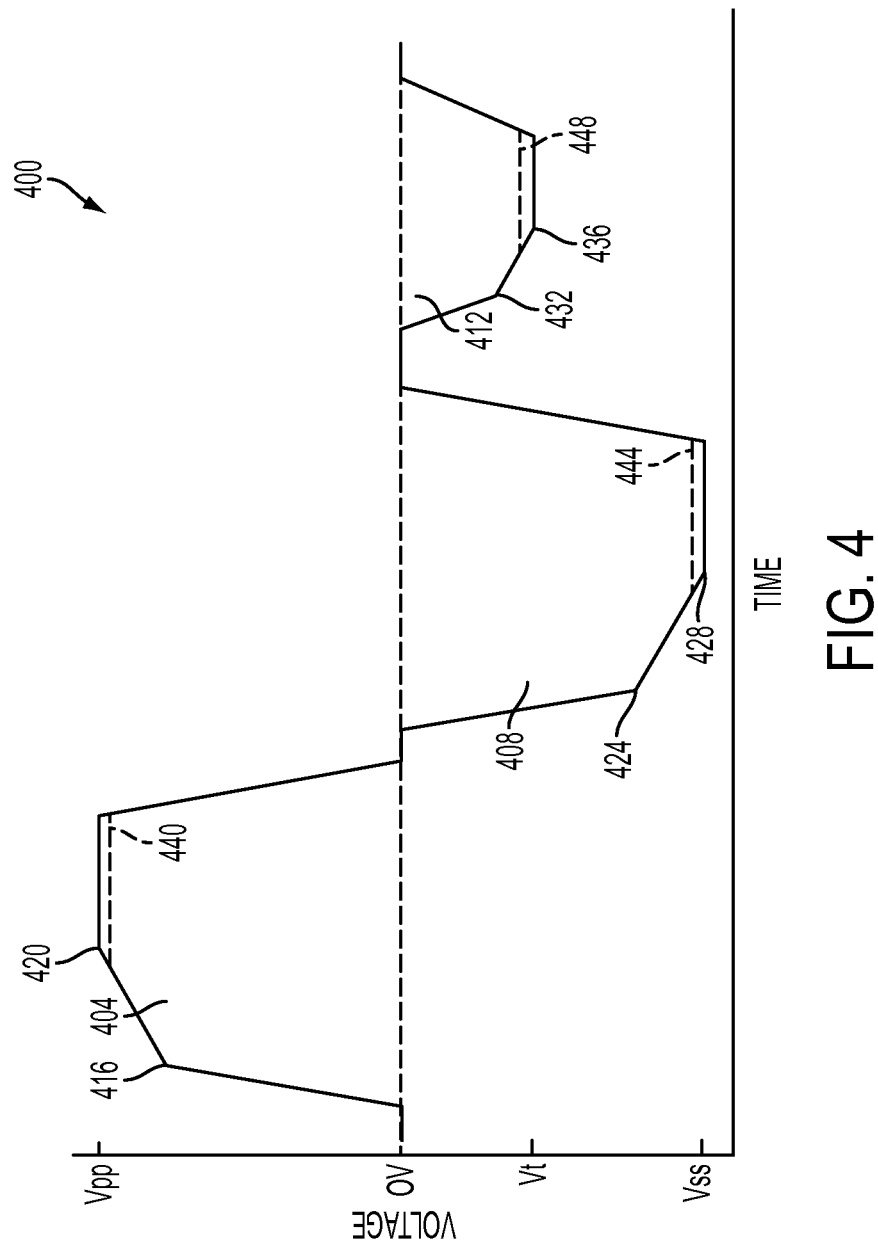
FIG. 4 depicts a waveform for a firing signal that operates an ejector of a printhead.

In the printer 60, the drop volume of an ejector can be increased by delivering a modified firing signal to the ejectors selected to compensate for a missing pass. FIG. 4 depicts a waveform for a firing signal 400 that the controller 108 sends to an ejector of a printhead to operate the ejector. The firing signal has a positive segment 404, a negative segment 408, and a tail segment 412. As used herein, the term "segment" means a contiguous portion of a waveform. The voltage of firing signal 400 in the positive segment 404 increases to an inflection voltage 416, and then increases at a lower rate to a positive voltage 420 at a maximum positive voltage $V_{pp}$ of the printhead. The firing signal 400 remains at the positive voltage 420 for a predetermined time period before decreasing to a zero voltage. In the negative segment 408, the voltage of the firing signal 400 decreases to an inflection voltage 424, and then decreases at a lower rate to a negative voltage 428 at a maximum negative voltage $V_{ss}$ of the printhead. The firing signal 400 remains at the negative voltage 428 for a predetermined time period before increasing to return to the zero voltage. Finally, in the tail segment 412, the voltage of the firing signal 400 decreases to an inflection voltage 432, and then decreases at a lower rate to a tail voltage 436 at maximum tail voltage $V_t$. The firing signal 400 remains at the tail voltage 436 for a predetermined time period before increasing to return to the zero voltage.

As depicted in FIG. 4, the positive segment 404 is earlier in time than the negative segment 408. However, the polarity of the segments 404 and 408 may be reversed depending on the polarity of a transducer of the ejector. Generally, the segments 404 and 408 have substantially identical magnitudes and waveform shapes with different polarities. The change in voltage between positive voltage 420 and the negative voltage 428 is referred to as the "peak-to-peak" of the firing signal. Similarly, the change in voltage between maximum positive voltage $V_{pp}$ and the maximum negative voltage $V_{ss}$ is referred to as the "maximum peak-to-peak" for firing signals of the printhead. The magnitude of the tail voltage 436 is less than the magnitude of the positive voltage 420 and the negative voltage 428 and the polarity of the tail voltage 436 may be either positive or negative.

In the printer 60, the maximum values $V_{pp}$, $V_{ss}$, and $V_t$ are configurable on a per-printhead basis. Thus, the firing signals generated for each ejector in a single printhead share a single $V_{pp}$, $V_{ss}$, and $V_t$ value. The printer 60 can calibrate different printheads with various values of $V_{pp}$, $V_{ss}$, and $V_t$ to enable the printheads to form layers of drops with generally uniform drop volumes. Within each printhead, individual ejectors may eject drops having different drop volumes allowing for variations in the drop volumes of drops ejected from a single printhead. This is accomplished by modifying the shape of a segment of a firing signal corresponding to an individual ejector. The controller 108 is configured to adjust the relative values of $V_{pp}$, $V_{ss}$, and $V_t$ for one or more of the individual ejectors in each printhead. In the positive segment 404, the controller 108 selects an adjusted positive voltage 440 which can range between the maximum positive voltage $V_{pp}$ and the inflection voltage 416. The relative difference between the maximum positive voltage $V_{pp}$ and the adjusted positive voltage 440 is referred to as a "norm click" value. The same relative reduction is applied to the negative segment 408 to determine an adjusted negative voltage 444. The change in voltage between the adjusted positive voltage 440 and the adjusted negative voltage 444 is referred to as the "adjusted peak-to-peak" of the firing signal. The controller 108 is also configured to select an adjusted tail voltage 448 which can range between the maximum tail voltage $V_t$ and the inflection voltage 432.

The controller 108 can be configured control the ejectors of a printhead using firings signals with a baseline peak-to-peak voltage that is less than the maximum peak-to-peak for the printhead. For example, a baseline positive voltage can be at the halfway point between the maximum positive voltage $V_{pp}$ and the inflection voltage 416 of each printhead so that the controller 108 has headroom to both increase and decrease the peak-to-peak voltages for each ejector. In this manner, the controller 108 can adjust the peak-to-peak voltage of the firing signal for an individual ejector of a printhead to control a drop volume of the ejector. Similarly, the controller 108 can be configured to operate ejectors with firing signals having a baseline tail voltage that is less than the maximum tail voltage so headroom to both increase and decrease the tail voltage for each ejector is available.

In addition to modifying a voltage amplitude of particular segments of the firing signals, the controller 108 can also be configured to modify the drop volume of an ejector by modifying a time duration of particular segments of the firing signal. A firing signal having longer positive and negative segments 404 and 408 generally causes an ejector to eject more material. The drop volume of an ejector can also be increased by ejecting multiple drops of material at the same position. The controller 108 can be configured to generate multiple firing signals to print multiple drops at locations that require an increased drop volume.

Figure 5:
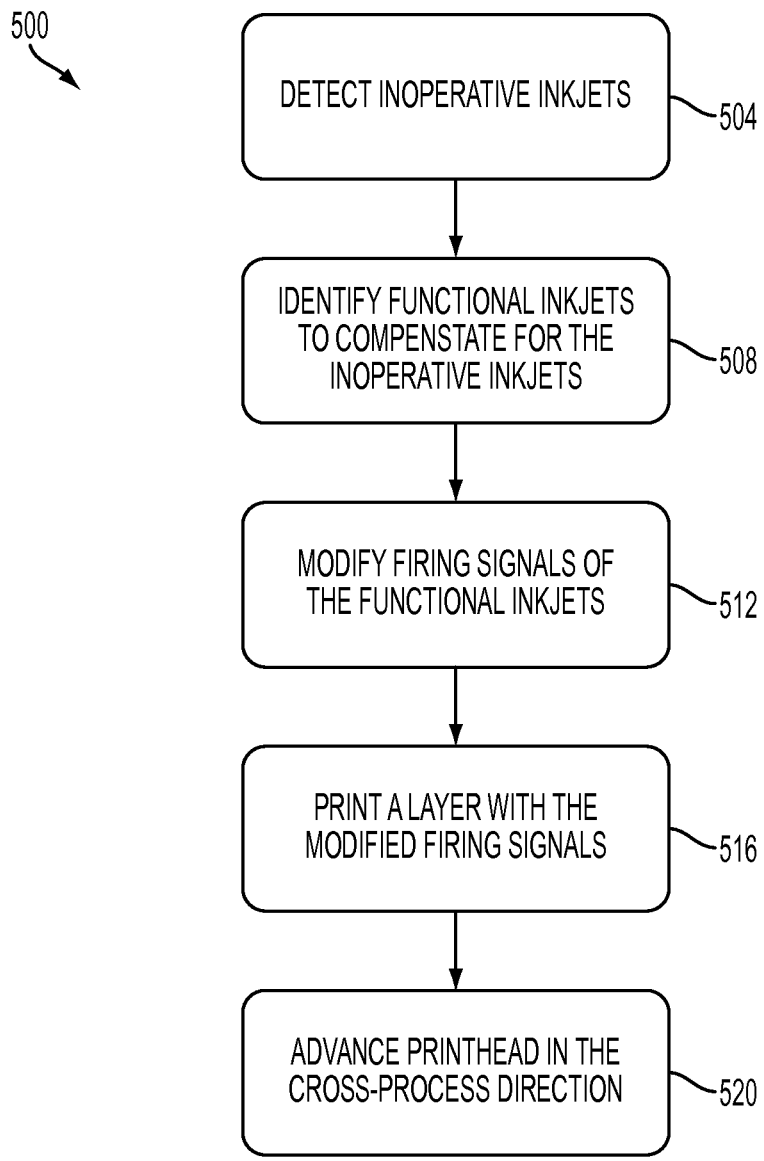
FIG. 5 is a flow diagram for a process for compensating for an inoperative ejector of a printhead.

FIG. 5 depicts a process 500 for compensating for inoperative ejectors in a printhead of a three-dimensional object printer. In the description of this process, statements that the process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

The printer 60 can be configured in the manner noted above to perform the process 500 and is referenced by way of example. The process begins by detecting inoperative ejectors in a printhead (block 504). The controller 108 commands the printhead 86 to move to the detection module 112, wherein the printhead 86 prints a test pattern which is analyzed by the detection module 112. The detection module 112 generates and sends a signal identifying one or more inoperative ejectors to the controller 108.

Once an inoperative ejector has been detected, the process 500 identifies at least one functional ejector to compensate for the inoperative ejector (block 508). The controller 108 identifies at least one functional ejector to be commanded to print drops having an increased drop volume in order to compensate for the inoperative ejector. Particularly, the controller 108 identifies print locations opposite the inoperative ejector and determines which functional ejectors print at adjacent or neighboring locations. The adjacent or neighboring print locations can be in the same layer, in a previous layer, or in a subsequent layer. The controller 108 may also be configured to disable the inoperative ejector, so that it does not attempt to eject material. Next, the process 500 modifies firing signals of the functional ejectors to compensate for the inoperative ejectors (block 512). The controller 108 modifies firing signals associated with the functional ejectors to cause them to print drops with an increased drop volume at the aforementioned adjacent or neighboring print locations. The firing signals can be modified by modifying a tail voltage, a peak-to-peak voltage, a time duration or frequency of the waveform, a number of pulses, or some combination of these parameters. Additionally, the firing signals can be modified to comprise a plurality of firing signals such that the ejector ejects multiple drops at a particular print location.

The process 500 continues by printing a layer of material drops using the modified firing signals (block 516). The controller 108 operates the printhead 86 to form a first layer of material drops using the modified firing signals. The modified firing signals cause the printhead to print drops having an increased volume at locations that are adjacent to or that neighbor locations where the inoperative ejector fails to print a drop. After printing a first layer, the process advances the printhead in the cross process direction (block 520). The controller 108 commands the printhead 86 to move in the cross-process direction by a predetermined number of print locations. In this way, the print locations where the inoperative ejector fails to print a drop are distributed such that unprinted drops do not coincide between layers.

Generally, the process steps of blocks 516 and 520 are performed repetitiously to print each layer of the three-dimensional object. The process steps of the blocks 504, 508, and 516 can be performed periodically to check for newly inoperative ejectors of the printhead 86 and to update the modified signals accordingly. These steps can be performed for every layer of the three-dimensional object or could be performed periodically based on a pre-defined time interval or number of layers.

Furthermore, in some embodiments, the printer is not configured to perform the process step of block 520, wherein the printhead is advanced between each layer. In that case, compensating drops having an increased volume can only be printed by the same neighboring ejectors for all layers as the print locations associated with the inoperative ejector remains aligned from one layer to the next layer.

As noted above, a "voxel" refers to data in one location of three-dimensional image data stored in memory and used to operate the ejectors for forming an object. Another embodiment identifies blank voxels, which are voxels with a data value of "0," in locations neighboring the non-zero voxels associated with a malfunctioning ejector and inserts data into these locations to operate the ejector and eject material at locations adjacent to where the malfunctioning ejector was intended to eject material. For example, halftoned images can be generated with many blank voxels by limiting a maximum fill rate to some predetermined rate, for example, 80% or 90%, to help ensure blank voxels are spread throughout the halftoned image. This technique can be combined with the method noted above by, for example, inserting data into blank voxels in locations neighboring voxels associated with a malfunctioning ejector if available, but if blank voxels are not available, then the waveform parameters for neighboring ejectors are modified to enable the drop mass of neighboring voxels to increase as explained above.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
   a printhead having a plurality of ejectors configured to eject material drops;
   a sensor configured to generate data corresponding to the material drops ejected by the ejectors in the printhead; and
   a controller operatively connected to the printhead and the sensor, the controller being configured to:
      identify a malfunctioning ejector with reference to the data generated by the sensor;
      identify at least one functional ejector in the printhead that ejects drops of material adjacent to positions opposite the identified malfunctioning ejector, the identified at least one functional ejector in the printhead being identified as an ejector that ejects drops of material in a layer of material drops formed before the first layer of material drops is formed;
      modify firing signals delivered to the at least one identified functional ejector to increase a drop volume of the material drops ejected adjacent to the positions opposite the malfunctioning ejector; and
      operate the printhead to form a first layer of material drops, the at least one identified functional ejector being operated with the modified firing signals.

2. The printer of claim 1, the controller being further configured to:
   move the printhead in a plane parallel to the first layer of material drops to position the malfunctioning ejector opposite positions in a next layer of material drops to be formed on the first layer of material drops that are different than the positions opposite the malfunctioning jet in the first layer of material drops.

3. The printer of claim 1, the controller being further configured to:
   modify the firing signals by modifying a shape of a segment of the firing signals.

4. The printer of claim 3, the controller being further configured to:
   modify the firing signals by modifying a voltage amplitude of a segment of the firing signals.

5. The printer of claim 3, the controller being further configured to:
   modify the firing signals by modifying a time duration of a segment of the firing signals.

6. The printer of claim 1, the controller being further configured to:
   modify the firing signal by generating a plurality of firing signals to operate the identified at least one functional ejector multiple times to eject multiple drops of material.

7. The printer of claim 1, the controller being further configured to:
   identify empty voxels corresponding to at least one functional ejector in the printhead that is positioned to eject drops of material adjacent to positions opposite the malfunctioning ejector;
   insert data into the empty voxels to operate the at least one functional ejector; and
   operate the printhead with the inserted data to eject material drops at positions adjacent to positions opposite the malfunctioning ejector.

8. A three-dimensional object printer comprising:
   a printhead having a plurality of ejectors configured to eject material drops;
   a sensor configured to generate data corresponding to the material drops ejected by the ejectors in the printhead; and
   a controller operatively connected to the printhead and the sensor, the controller being further configured to:
      identify a malfunctioning ejector with reference to the data generated by the sensor;
      identify at least one functional ejector in the printhead that ejects drops of material adjacent to positions opposite the identified malfunctioning ejector, the identified at least one functional ejector in the printhead being identified as an ejector that ejects drops of material in a layer of material drops formed after the first layer of material drops is formed;
      modify firing signals delivered to the at least one identified functional ejector to increase a drop volume of the material drops ejected adjacent to the positions opposite the malfunctioning ejector; and
      operate the printhead to form a first layer of material drops, the at least one identified functional ejector being operated with the modified firing signals.

9. The printer of claim 8, the controller being further configured to:
   move the printhead in a plane parallel to the first layer of material drops to position the malfunctioning ejector opposite positions in a next layer of material drops to be formed on the first layer of material drops that are different than the positions opposite the malfunctioning jet in the first layer of material drops.

10. The printer of claim 9, the controller being further configured to:
    modify the firing signals by modifying a voltage amplitude of a segment of the firing signals.

11. The printer of claim 9, the controller being further configured to:
    modify the firing signals by modifying a time duration of a segment of the firing signals.

12. The printer of claim 8, the controller being further configured to: modify the firing signal by generating a plurality of firing signals to operate the identified at least one functional ejector multiple times to eject multiple drops of material.

13. The printer of claim 8, the controller being further configured to:
    modify the firing signals by modifying a shape of a segment of the firing signals.

14. The printer of claim 8, the controller being further configured to:

identify empty voxels corresponding to at least one functional ejector in the printhead that is positioned to eject drops of material adjacent to positions opposite the malfunctioning ejector;
insert data into the empty voxels to operate the at least one functional ejector; and
operate the printhead with the inserted data to eject material drops at positions adjacent to positions opposite the malfunctioning ejector.

* * * * *